(12) United States Patent  
Ozawa et al.

(10) Patent No.: US 8,985,259 B2  
(45) Date of Patent: Mar. 24, 2015

(54) FUEL CELL VEHICLE

(75) Inventors: Naoki Ozawa, Hamamatsu (JP); Shiro Matsumoto, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 14/004,825

(22) PCT Filed: Feb. 29, 2012

(86) PCT No.: PCT/JP2012/055046  
§ 371 (c)(1),  
(2), (4) Date: Sep. 12, 2013

(87) PCT Pub. No.: WO2012/137561  
PCT Pub. Date: Oct. 11, 2012

(65) Prior Publication Data  
US 2013/0341114 A1   Dec. 26, 2013

(30) Foreign Application Priority Data  
Apr. 7, 2011   (JP) .................................. 2011-085480

(51) Int. Cl.  
*B60K 1/04* (2006.01)  
*B60L 11/18* (2006.01)  
(Continued)

(52) U.S. Cl.  
CPC .............. *B60L 11/1896* (2013.01); *B60K 1/04* (2013.01); *B60L 3/0007* (2013.01);  
(Continued)

(58) Field of Classification Search  
CPC .............. B60K 1/00; B60K 1/04; B60K 8/00; B60K 11/06; B60K 2001/001; B60K 2001/003; B60K 2001/005; B60K 2001/0411  
USPC .......................... 180/291, 292, 293, 299, 300  
See application file for complete search history.

(56) References Cited

U.S. PATENT DOCUMENTS 5,662,184 A * 9/1997 Riemer et al. ................ 180/65.1  
6,715,571 B2 * 4/2004 Nakamori .................... 180/65.1  
(Continued)

FOREIGN PATENT DOCUMENTS

JP         4265367 B2       5/2009  
JP         2010-12963       1/2010  
WO    WO 2011-099084 A1    8/2011

OTHER PUBLICATIONS

International Search Report and Written Opinion for International Application No. PCT/JP2012-055046 mail May 22, 2012.

*Primary Examiner* — John Walters  
(74) *Attorney, Agent, or Firm* — Alston & Bird LLP

(57) ABSTRACT

In a fuel cell vehicle, the power generation amount of a fuel cell into which air is introduced from a front side of a vehicle and from which air is discharged to a rear side of the vehicle is increased while the fuel cell is protected when an impact force acts on the vehicle. A fuel cell case (24) is arranged in a cage-shaped sub frame (32) surrounding a front, rear, left, and right side portions of the fuel cell case (24), a drive unit (7) formed by coupling a drive motor (5) and a gear box (6) to each other is joined to a rear side portion of the sub frame (32), and left and right end portions of the sub frame (32) and the drive unit (7) are supported on a vehicle body (15) respectively by mounting devices (33, 34, 35).

1 Claim, 3 Drawing Sheets

(51) Int. Cl.
*B60L 3/00* (2006.01)
*H01M 8/24* (2006.01)
*B60K 1/02* (2006.01)

(52) U.S. Cl.
CPC .......... *B60L 3/0053* (2013.01); *B60L 11/1898* (2013.01); *H01M 8/24* (2013.01); *B60K 1/02* (2013.01); *B60K 2001/0411* (2013.01); *Y02E 60/50* (2013.01); *Y02T 90/34* (2013.01); *Y02T 90/32* (2013.01); *H01M 2250/20* (2013.01)
USPC .......................................... 180/292; 180/299

(56) References Cited

U.S. PATENT DOCUMENTS

| 6,994,178 | B2* | 2/2006 | Mizuno | 429/430 |
| 7,144,039 | B2* | 12/2006 | Kawasaki et al. | 280/784 |
| 7,726,429 | B2* | 6/2010 | Suzuki | 180/232 |
| 2005/0158606 | A1* | 7/2005 | Xia et al. | 429/34 |
| 2008/0073133 | A1* | 3/2008 | Winter et al. | 180/65.3 |
| 2008/0142289 | A1* | 6/2008 | Yang et al. | 180/299 |

* cited by examiner

FUEL CELL VEHICLE

CROSS-REFERENCE TO RELATED APPLICATIONS

This application is a national stage application filed under 35 U.S.C. 371 of International Application No. PCT/JP2012/055046, filed Feb. 29, 2012, which claims priority from Japanese Patent Application No. 2011-085480, filed Apr. 7, 2011, each of which is incorporated by reference herein in its entirety.

TECHNICAL FIELD

The present invention relates to a fuel cell vehicle and, in particular, relates to a fuel cell vehicle in which a fuel cell is protected.

BACKGROUND ART

Among fuel cell vehicles, there is one in which a fuel cell, a drive motor, and a gear box are mounted in a front portion of the vehicle, the fuel cell is configured to introduce air from a front side of the vehicle and to discharge air to a rear side of the vehicle, and the gear box is configured to transmit a drive force to a front wheel.

CITATION LIST

Patent Literature

PTL 1 Japanese Patent No. 4265367

A fuel cell system for a vehicle according to Patent Document 1 has a structure in which a unit body formed by coupling a fuel cell and a drive motor respectively to both end portions of a gear box in a vehicle width direction is mounted in a front portion of the vehicle.

SUMMARY OF INVENTION

Technical Problems

However, Patent Literature 1 described above has a drawback in that, in the case in which the fuel cell is mounted on a vehicle, it is difficult to increase the dimension of the fuel cell in a vehicle width direction due to the structure.

Moreover, among fuel cells, there is one in which power generation and cooling of the fuel cell is performed by using air introduced into the fuel cell from the front side of the vehicle by an air blower such as a fan and air having cooled the fuel cell is discharged toward the rear side of the vehicle. Such a fuel cell has a problem in that a required power generation amount cannot be secured if the width and the height of the fuel cell cannot be increased.

The above-described problems can be solved by disposing the drive motor and the gear box behind the fuel cell, thus allowing the fuel cell to be extended in the vehicle width direction. However, when an impact force acts from the front side of the vehicle, the fuel cell may hit the drive motor and the gear box in some cases. Thus, there is a demand for a structure that can protect the fuel cell.

In view of the above, an object of the present invention is to provide a fuel cell vehicle capable of increasing the power generation amount of a fuel cell which introduces air from a front side of the vehicle and which discharges air to a rear side of the vehicle and is also capable of protecting the fuel cell when an impact force acts on the vehicle.

Solution to Problem

The present invention is a fuel cell vehicle in which a fuel cell, a drive motor, and a gear box are mounted in a front portion of the vehicle, the fuel cell configured to introduce air from a front side of the vehicle and to discharge air to a rear side of the vehicle, the gear box configured to transmit a drive force to a front wheel, wherein the fuel cell is housed in a fuel cell case with an intake duct and an exhaust duct being attached to side faces of the fuel cell case on the vehicle front side and the vehicle rear side, respectively, the fuel cell case is arranged in a cage-shaped sub frame surrounding a front, rear, left, and right side portions of the fuel cell case, a drive unit formed by coupling the drive motor and the gear box to each other is joined to a rear side portion of the sub frame, and left and right end portions of the sub frame and the drive unit are supported on a vehicle body respectively by mounting devices.

Effects of Invention

The fuel cell vehicle of the present invention is capable of increasing the power generation amount of the fuel cell which introduces air from the front side of the vehicle and which discharges air to the rear side of the vehicle and is also capable of protecting the fuel cell when an impact force acts on the vehicle from the front side.

DESCRIPTION OF EMBODIMENT

An object of the present invention is to increase the power generation amount of a fuel cell which introduces air from a front side of a vehicle and which discharges air to a rear side of the vehicle and also to protect the fuel cell when an impact force acts on the vehicle from the front side. The object is achieved in such a way that the fuel cell is extended in a vehicle width direction, and a sub frame and a drive unit are supported on a vehicle body respectively by mounting devices.

Embodiment

FIGS. 1 to 6 illustrate an embodiment of the present invention.

Figure 6:
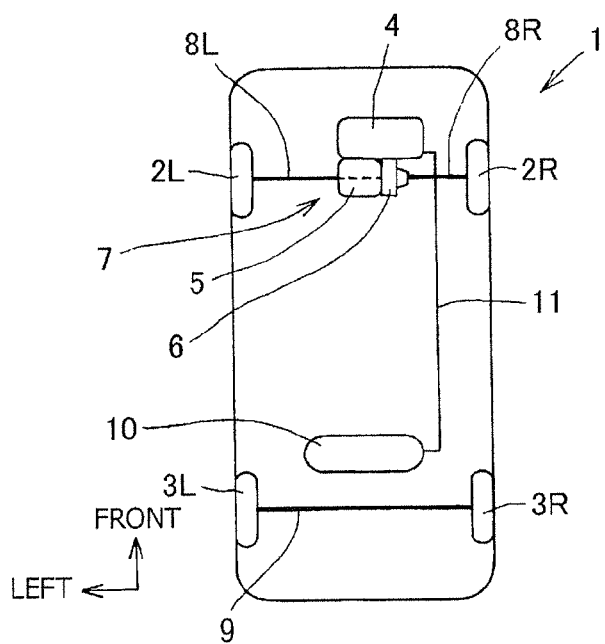
FIG. 6 is a schematic plan view of the vehicle. (Embodiment)

In FIG. 6, reference numeral 1 denotes a fuel cell vehicle (hereafter, referred to as a "vehicle") which is a four-wheel vehicle, reference numeral 2L denotes a left front wheel, reference numeral 2R denotes a right front wheel, reference numeral 3L denotes a left rear wheel, and reference numeral 3R denotes a right rear wheel.

In the vehicle 1, a fuel cell 4 which introduces air from the front side of the vehicle and which discharges air to the rear side of the vehicle, a drive motor 5, and a gear box 6 which transmits a drive force to the left front wheel 2L and the right front wheel 2R are mounted in a front portion. The drive motor 5 and the gear box 6 are arranged side by side in the vehicle width direction and are coupled to each other to form a drive unit 7. In this case, an output portion of the gear box 6 is located below the drive motor 5. A left front axle 8L to which the left front wheel 2L is attached is coupled to the gear box 6 while a right front axle 8R to which the right front wheel 2R is attached is also coupled to the gear box 6. Moreover, the left rear wheel 3L and the right rear wheel 3R are coupled to each other by a rear axle 9.

Furthermore, a hydrogen tank 10 is mounted in a rear portion of the vehicle 1. One end of a hydrogen pipe 11 is connected to the hydrogen tank 10. The hydrogen pipe 11 extends in a vehicle front-rear direction and the other end of the hydrogen pipe 11 is connected to the fuel cell 4 in the front portion of the vehicle 1.

Figure 1:
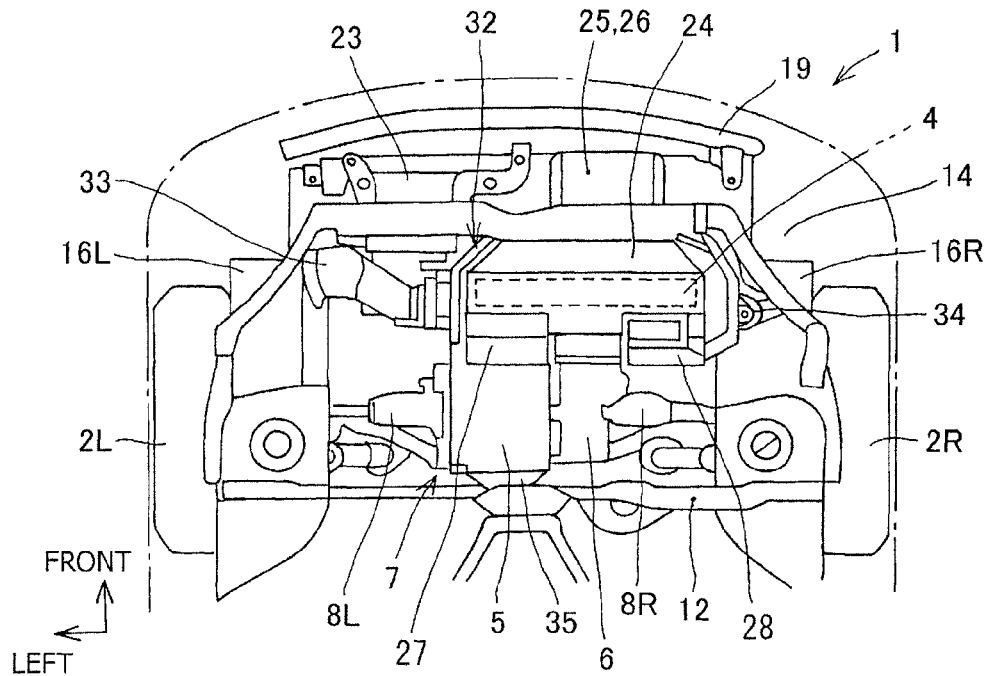
FIG. 1 is a plan view of a front portion of a vehicle. (Embodiment)
Figure 2:
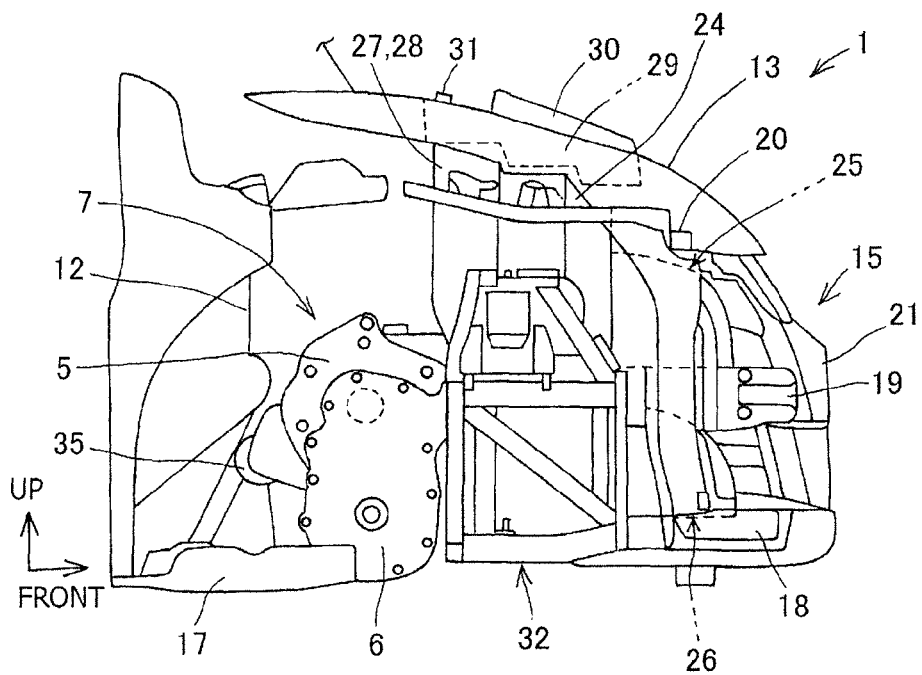
FIG. 2 is a right-side view of the front portion of the vehicle. (Embodiment)

As shown in FIGS. 1 and 2, the fuel cell 4 and the drive unit 7 are arranged in a unit space 14 which is formed by a dash panel 12 and a front hood 13 in the front portion of the vehicle 1.

Figure 3:
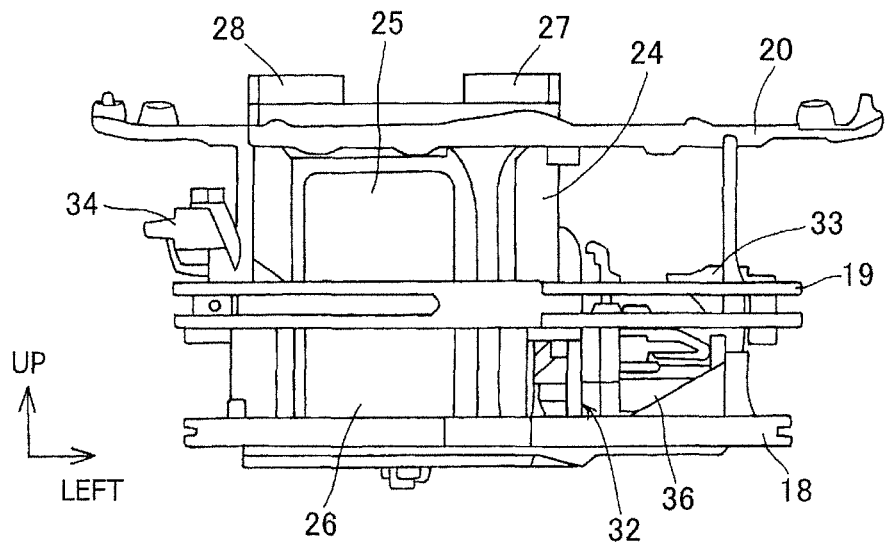
FIG. 3 is a front view of the front portion of the vehicle. (Embodiment)

Moreover, as shown in FIGS. 1 to 3, in the front portion of the vehicle 1, a pair of left side member 16L and right side member 16R which extend in the vehicle front-rear direction are arranged and a suspension frame 17, a lower member 18, a bumper member 19, a hood lock member 20, and a front bumper 21 are each arranged at a position at a predetermined height in such a way that vehicle body 15 is formed. In addition, as shown in FIG. 1, in the front portion of the vehicle 1, a radiator 23 is mounted on the left side, behind the bumper member 19.

As shown in FIGS. 1 and 3, the fuel cell 4 is housed in a fuel cell case 24. A pair of upper and lower intake ducts 25, 26 are attached to a side face of the fuel cell case 24 on the vehicle front side while a pair of left and right exhaust ducts 27, 28 are attached to a side face of the fuel cell case 24 on the vehicle rear side.

As shown in FIG. 2, an exhaust chamber 29 and an exhaust cover 30 are arranged above the exhaust ducts 27, 28. Moreover, the front hood 13 is provided with a hydrogen gas discharge port 31 near the exhaust cover 30.

The fuel cell case 24 is arranged in a cage-shaped sub frame 32 which surrounds front, rear, left, and right side portions of the fuel cell case 24.

Figure 5:
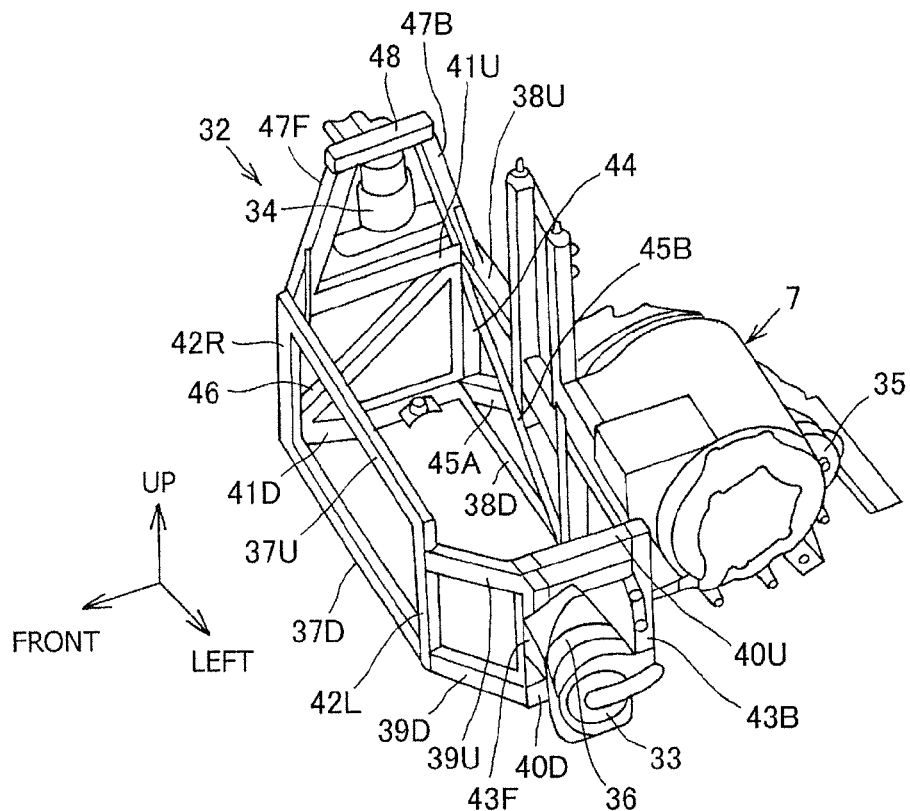
FIG. 5 is a left front perspective view of the sub frame. (Embodiment)

As shown in FIG. 5, the drive unit 7 is joined to a rear side portion of the sub frame 32. Left and right end portions of the sub frame 32 and the drive unit 7 are supported on the vehicle body 15 respectively by a left mounting device 33, a right mounting device 34, and a rear mounting device 35 which are mounting devices. As shown in FIGS. 3 and 5, the left mounting device 33 is attached to a left side portion of the sub frame 32 via a mounting bracket 36. The right mounting device 34 is attached to a right side portion of the sub frame 32. The rear mounting device 35 is attached to the drive motor 5 at a rear position.

The structure described above enables extension of the fuel cell 4 in the vehicle width direction, free from the effect of the drive motor 5 and the gear box 6. Accordingly, the numbers of cells and air passages in the fuel cell 4 can be increased. In addition, it is possible to enlarge the fuel cell case 24 and to thereby increase the amount of air passing through the fuel cell 4. As a result, the power generation amount of the fuel cell 4 can be increased.

Moreover, when an impact force acts on the vehicle 1 from the front side, the fuel cell 4 can be protected by the fuel cell case 24 and the front face portion of the fuel cell case 24 can be protected from being hit by vehicle body parts and the radiator 23 which move toward the rear side of the vehicle, by covering the front face portion with the sub frame 32.

Furthermore, the fuel cell case 24 can be protected by covering the side face of the fuel cell case 24 facing the drive unit 7 with the sub frame 32 in such a way that the fuel cell case 24 does not directly hit the drive unit 7.

In addition, it is possible to mount the fuel cell case 24 housing the fuel cell 4 integrally with the drive unit 7 on the vehicle 1 and thereby improve the mountablity of the fuel cell 4 and the fuel cell case 24 onto the vehicle 1.

As shown in FIG. 5, the sub frame 32 is formed in the cage shape by a plurality of cross members extending in the vehicle width direction, a plurality of side members extending in a vehicle front-rear direction, and a plurality of side braces extending in a vehicle up-down direction.

The cross members include: a front upper cross member 37U and a front lower cross member 37D which are arranged in a front portion of the sub frame 32; a rear upper cross member 38U and a rear lower cross member 38D which are arranged in a rear portion of the sub frame 32; and an oblique upper cross member 39U and an oblique lower cross member 39D which are arranged in a left front portion of the sub frame 32.

The side members include: a left upper side member 40U and a left lower side member 40D which are arranged in a left portion of the sub frame 32; and a right upper side member 41U and a right lower side member 41D which are arranged in a right portion of the sub frame 32.

The side braces include: a left front side brace 42L and a right front side brace 42R which connect the front upper cross member 37U and the front lower cross member 37D to each other; a left front side brace 43F and a left rear side brace 43B which connect the left upper side member 40U and the left lower side member 40D to each other; and a right rear side brace 44 which connects the right upper side member 41U and the right lower side member 41D to each other.

The front upper cross member 37U, the front lower cross member 37D, the left front side brace 42L, and the right front side brace 42R form a rectangular front frame in the front portion of the sub frame 32.

The rear upper cross member 38U, the rear lower cross member 38D, the left rear side brace 43B, and the right rear side brace 44 form a rectangular rear frame in the rear portion of the sub frame 32. First and second rear reinforcement oblique member 45A, 45B are arranged in the rear frame to obliquely traverse the rear frame.

The right upper side member 41U, the right lower side member 41D, the right front side brace 42R, and the right rear side brace 44 form a rectangular right frame in the right portion of the sub frame 32. A right reinforcement member 46 is arranged in the right frame.

Moreover, a front oblique side brace 47F and a rear oblique side brace 47B which are used for the joining of the right mounting device 34 and a right joining side member 48 which connects the front oblique side brace 47F and the rear oblique side brace 47B to each other are arranged above the right upper side member 41U.

Then, as shown in FIG. 1, the front upper cross member 37U out of the front upper cross member 37U and the front lower cross member 37D is arranged to face the bumper member 19 arranged in front of the fuel cell case 24.

Such a structure can protect the fuel cell case 24 and the fuel cell 4 by causing the bumper member 19 to hit the front upper cross member 37U when the bumper member 19 moves toward the rear side of the vehicle due to an impact force acting from the front side of the vehicle.

Figure 4:
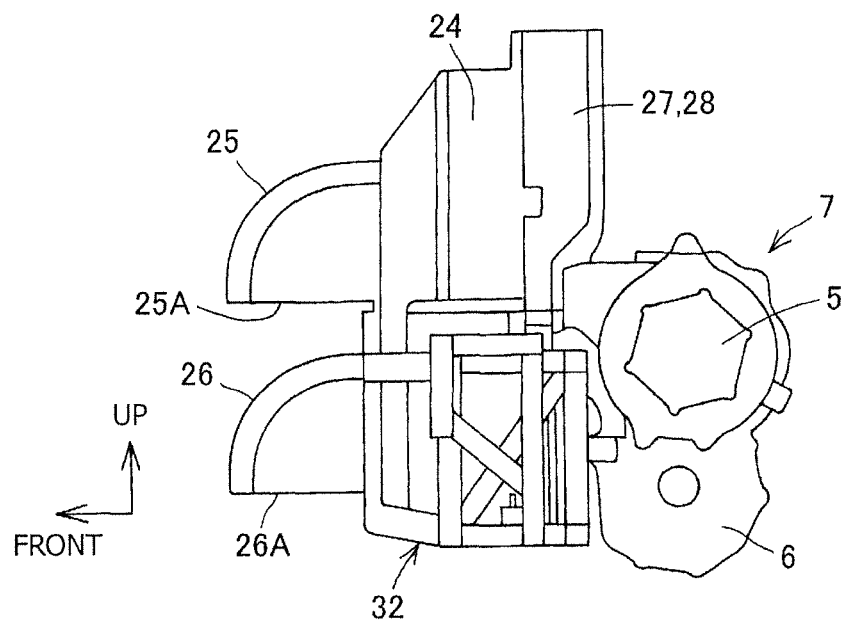
FIG. 4 is a left-side view of a sub frame to which a fuel cell and a drive unit are attached. (Embodiment)

Furthermore, as shown in FIG. 4, air introduction ports 25A, 26A of the intake ducts 25, 26 are open toward a lower side of the vehicle. Moreover, the intake ducts 25, 26 protrude toward the front side of the vehicle beyond the sub frame 32.

In this structure, by designing the air introduction ports 25A, 26A of the intake ducts 25, 26 to open toward the lower side of the vehicle, the intake ducts 25, 26 can have a structure easily deformable or breakable by an impact force acting from the front side of the vehicle.

Moreover, by designing the intake ducts 25, 26 to protrude toward the front side of the vehicle beyond the sub frame 32, the intake ducts 25, 26 can be made to deform or break when an impact force acts from the front side of the vehicle, and thereby absorb the impact force.

INDUSTRIAL APPLICABILITY

A sub frame of the present invention can be applied to various vehicles.

REFERENCE SIGNS LIST

1 Vehicle
4 Fuel cell
5 Drive motor
6 Gear box
7 Drive unit
19 Bumper member
24 Fuel cell case
25 Intake duct (upper side)
26 Intake duct (lower side)
27 Exhaust duct (left side)
28 Exhaust duct (right side)
32 Sub frame
37U Front upper cross member
37D Front lower cross member

The invention claimed is:

1. A fuel cell vehicle in which a fuel cell, a drive motor, and a gear box are mounted in a front portion of the vehicle, the fuel cell configured to introduce air from a front side of the vehicle and to discharge air to a rear side of the vehicle, the gear box configured to transmit a drive force to a front wheel, wherein the fuel cell is housed in a fuel cell case with an intake duct and an exhaust duct being attached to side faces of the fuel cell case on the vehicle front side and the vehicle rear side, respectively, the fuel cell case is arranged in a cage-shaped sub frame surrounding a front, rear, left, and right side portions of the fuel cell case, a drive unit formed by coupling the drive motor and the gear box to each other is joined to a rear side portion of the sub frame, left and right end portions of the sub frame and the drive unit are supported on a vehicle body respectively by mounting devices, and an air introduction port of the intake duct is open toward a lower side of the vehicle and the intake duct protrudes toward the front side of the vehicle beyond the sub frame.

* * * * *